(12) United States Patent
Tanaka et al.

(10) Patent No.: US 7,877,848 B2
(45) Date of Patent: Feb. 1, 2011

(54) METHOD FOR FABRICATING AN ANGULAR VELOCITY SENSOR

(75) Inventors: Hiroshi Tanaka, Yokohama (JP); Yuki Endo, Yokohama (JP); Masanori Yachi, Yokohama (JP); Kazutaka Araya, Yokohama (JP); Yoshinori Uwano, Yokohama (JP)

(73) Assignee: Tamagawa Seiki Co., Ltd, Nagano Prefecture (JP)

( * ) Notice: Subject to any disclaimer, the term of this patent is extended or adjusted under 35 U.S.C. 154(b) by 352 days.

(21) Appl. No.: 12/036,585

(22) Filed: Feb. 25, 2008

(65) Prior Publication Data

US 2008/0202238 A1    Aug. 28, 2008

(30) Foreign Application Priority Data

Feb. 23, 2007    (JP) .............................. 2007-043363

(51) Int. Cl.
*H01L 41/22* (2006.01)
*B23P 17/00* (2006.01)
*G01P 3/44* (2006.01)

(52) U.S. Cl. .......................... 29/25.35; 29/412; 29/417; 29/557; 73/504.16

(58) Field of Classification Search ................ 29/25.35, 29/412, 417, 557; 73/504.16
See application file for complete search history.

(56) References Cited

U.S. PATENT DOCUMENTS

| 5,239,736 | A | * | 8/1993 | Sliwa et al. | ................. 29/25.35 |
| 5,901,445 | A | * | 5/1999 | Woods et al. | .............. 29/896.6 |
| 6,532,817 | B1 | * | 3/2003 | Yukawa et al. | ........... 73/504.16 |

FOREIGN PATENT DOCUMENTS

| JP | 07-260488 A | 10/1995 |
| JP | 08-210856 A | 8/1996 |
| JP | 2000-180182 A | 6/2000 |
| JP | 2000-193457 A | 7/2000 |
| JP | 2001-012953 A | 1/2001 |
| JP | 2001-165664 | 6/2001 |
| JP | 2002-022445 A | 1/2002 |
| JP | 2002-213963 A | 7/2002 |
| JP | 2003-042768 A | 2/2003 |
| JP | 2004-301510 | 10/2004 |
| JP | 2006-010659 A | 1/2006 |
| JP | 2006-145420 A | 6/2006 |

* cited by examiner

*Primary Examiner*—Jermie E Cozart
(74) *Attorney, Agent, or Firm*—Arent Fox, LLP

(57) ABSTRACT

An angular velocity sensor includes a tuning-fork vibrator having a base and multiple arms extending from the base. Two arms out of the multiple arms driven to vibrate have first end parts opposite to second end parts connected to the base. The first end parts being wider than the second end parts.

5 Claims, 19 Drawing Sheets

Fig. 1A
Fig. 1B
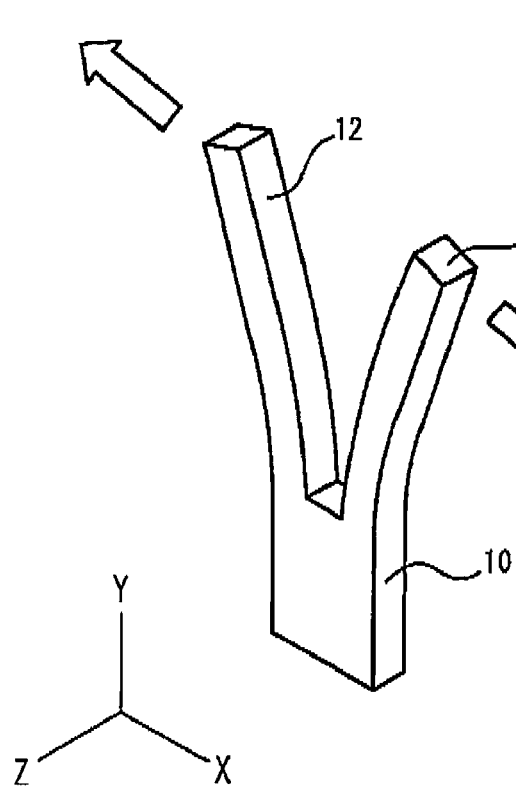
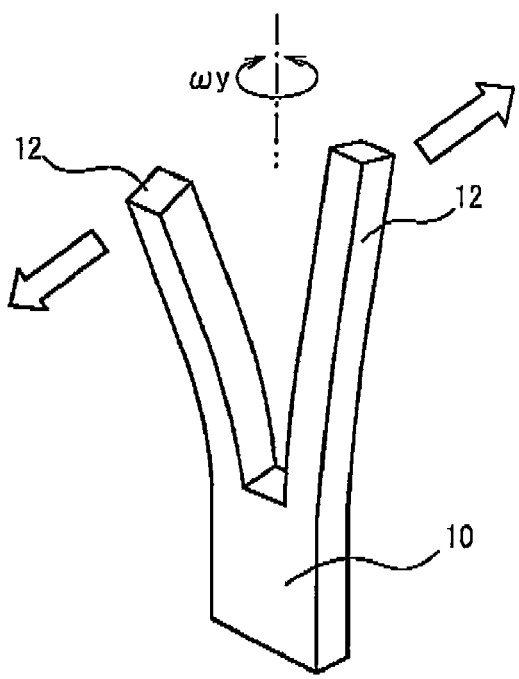

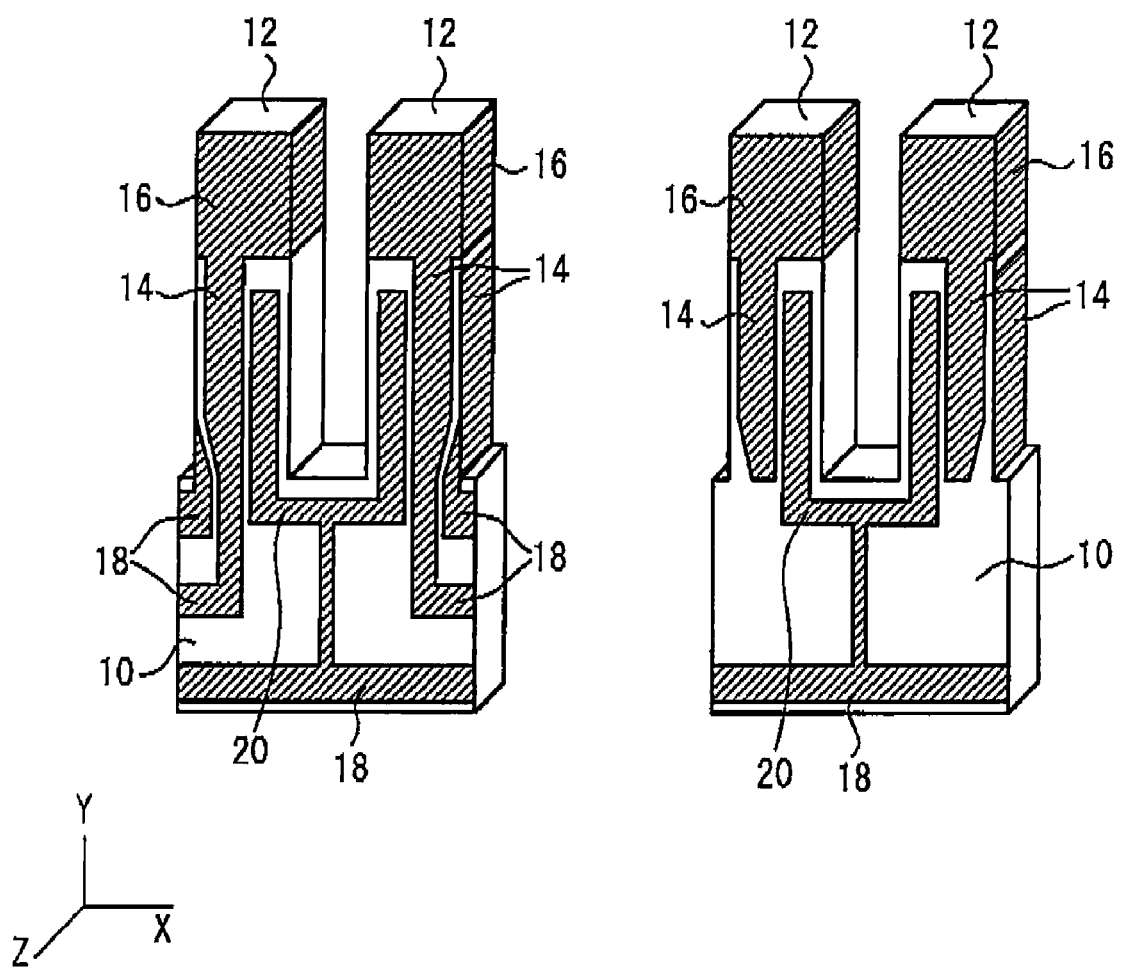

Fig. 4A
Fig. 4B
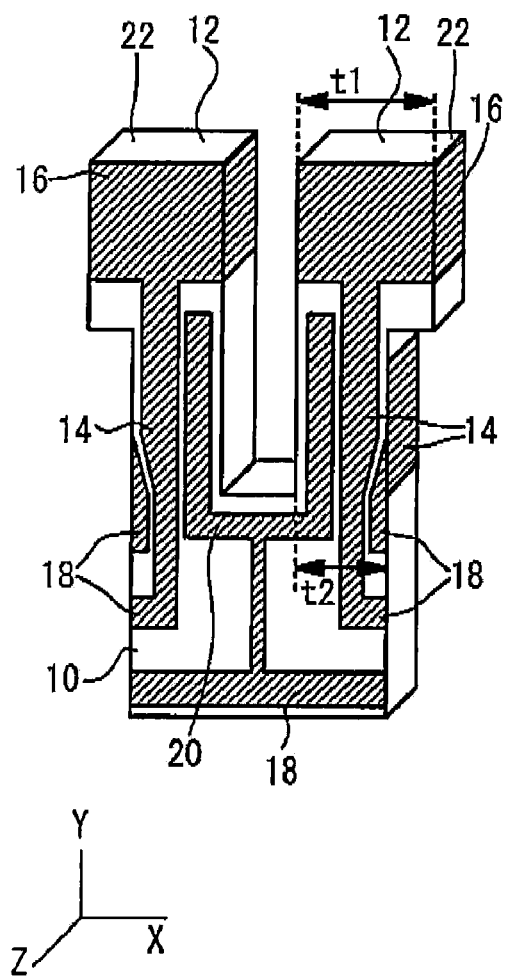
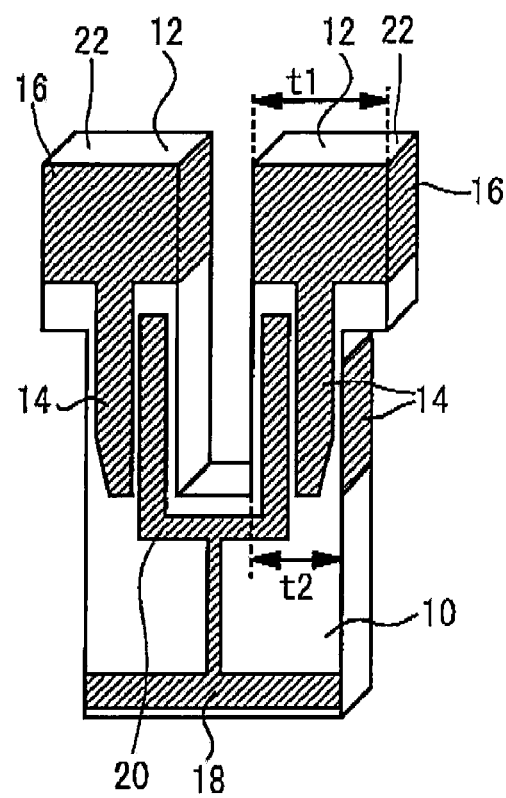

Fig. 18A
Fig. 18B
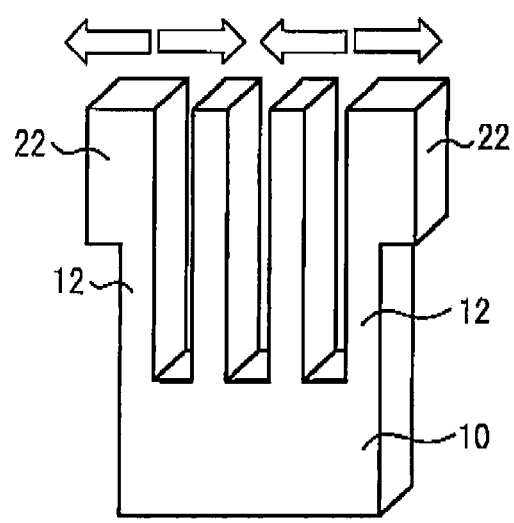
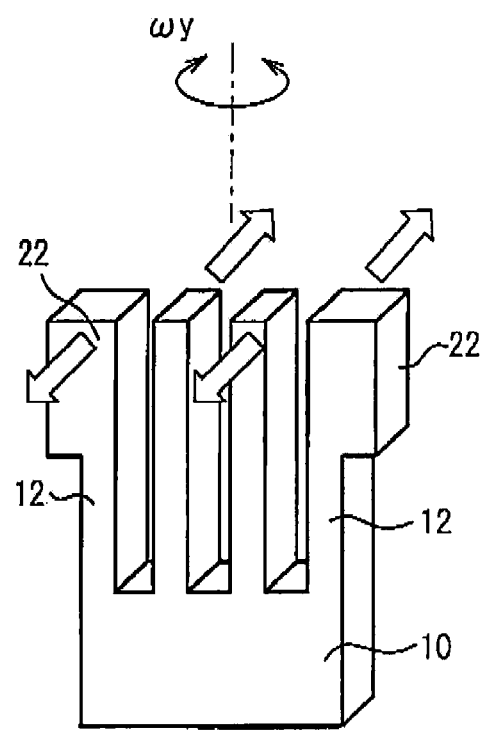
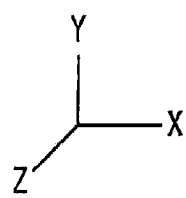

Fig. 21A
Fig. 21B
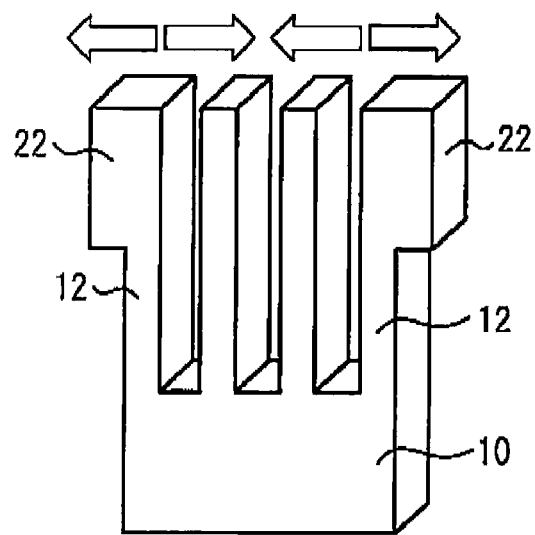
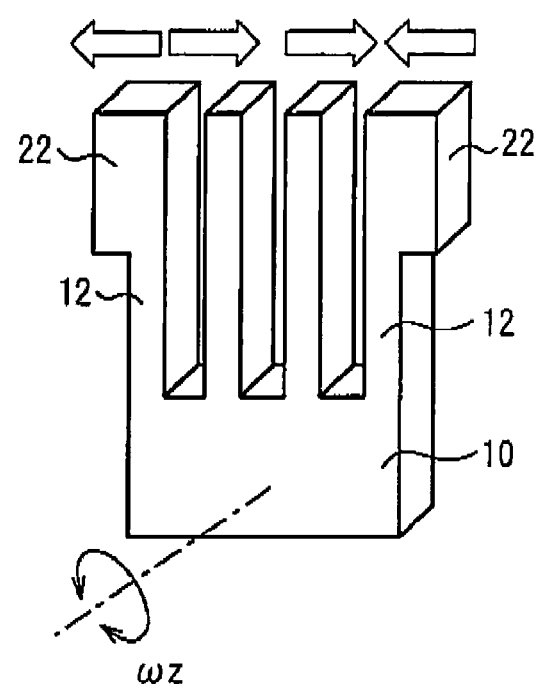
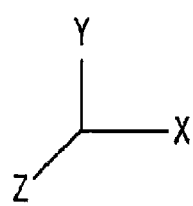

METHOD FOR FABRICATING AN ANGULAR VELOCITY SENSOR

BACKGROUND OF THE INVENTION

1. Field of the Invention

The present invention generally relates to an angular velocity sensor and a method for fabricating the same and more particularly, to an angular velocity sensor having a tuning-fork vibrator and a method for fabricating the same.

2. Description of the Related Art

An angular velocity sensor is a sensor that senses an angular velocity in rotation, and is used in systems for image stabilization of camera, for automotive navigation, for stability control of vehicles or postures of robots, and the like. Japanese Patent Application Publication No. 2001-165664 discloses an angular velocity sensor having a tuning-fork vibrator and a technique to improve drive efficiency by a composition of electrodes provided on the tuning-fork vibrator which is made by putting together two tuning-fork vibrators directly so that each of generated electric charges of the tuning-fork vibrators is opposite each other. Japanese Patent Application Publication No. 2004-301510 discloses an angular velocity sensor having a tuning-fork vibrator and a technique to sense angular velocities about a plurality of axes. In order to realize this technique, it needs to put some weight on upper parts of arms of the tuning-fork vibrator in order to increase inertial force.

Tuning-fork vibrators make a progress in downsizing in accordance with downsizing of angular velocity sensors. However, downsized tuning-fork vibrators have a problem to decrease drive efficiency and thus amplitude in driving vibration is small. In this case, amplitude in detecting vibration generated by Coriolis force is relatively small when an angular velocity is applied, and it is thus difficult to sense angular velocity.

SUMMARY OF THE INVENTION

The present invention has been made in view of the above-mentioned circumstances and provides an angular velocity sensor, which is suitable for mass-production being made of high electromechanical coupling coefficient piezoelectric single crystal and have high sensitivity and high drive efficiency, and a method for fabricating the same thereof.

According to an aspect of the present invention, there is provided an angular velocity sensor including: a tuning-fork vibrator having a base and multiple arms extending from the base, two arms out of the multiple arms driven to vibrate having first end parts opposite to second end parts connected to the base, the first end parts being wider than the second end parts. According to another aspect of the present invention, there is provided a method for fabricating an angular velocity sensor including: cutting a substrate made of one of LiNbO$_3$ and LiTaO$_3$ into a piece; forming grooves extending from opposite sides of the piece alternately, the grooves having a length equal to or greater than half of a distance connecting the opposite sides; and dividing the piece into parts in the grooves extending from either one of the opposite sides so as to form dividing grooves narrower than the grooves.

BRIEF DESCRIPTION OF THE DRAWINGS

FIG. 1A shows a driving vibration of two arms, and FIG. 1B shows a detecting vibration when an angular velocity about a Y axis is applied to;

FIGS. 2A and 2B are perspective views of a front surface and a back surface of a tuning-fork vibrator of an angular velocity sensor in accordance with a first comparative example;

FIGS. 4A and 4B are perspective views of a front surface and a back surface of a tuning-fork vibrator of an angular velocity sensor in accordance with a first variation of the first embodiment;

FIG. 10A shows a driving vibration of the tuning-fork vibrator of the angular velocity sensor in accordance with the first embodiment, and FIG. 10B shows a detecting vibration when an angular velocity about Y axis is applied to;

FIG. 13B shows a detecting vibration when an angular velocity about Z axis is applied to;

FIG. 18A shows driving vibrations of four arms, and FIG. 18B shows detecting vibrations of the four arms when an angular velocity about a Y axis is applied to;

FIG. 21A shows driving vibrations of four arms, and FIG. 21B shows detecting vibrations of the four arms when an angular velocity about a Z axis is applied to.

DESCRIPTION OF THE PREFERRED EMBODIMENTS

A description will now be given of embodiments of the present invention with reference to the accompanying drawings.

First Embodiment

A first embodiment is an angular velocity sensor having a tuning-fork vibrator composed of two arms and a base. The tuning-fork vibrator senses an angular velocity about Y axis of the tuning-fork vibrator, which is a longitudinal direction of the arms 12. A description is now given, with reference to FIGS. 1A and 1B, of a driving vibration of the tuning-fork vibrator and a detecting vibration that is caused when an angular velocity about Y axis is applied. It is assumed that the longitudinal direction of the arms 12 of the tuning-fork vibrator is Y axis, the width direction is X axis, and the thickness direction is Z axis, Referring to FIG. 1A, the arms 12 vibrates so as to become close to and away from each other in turn when a drive signal is applied to driving electrodes (not shown) of the tuning-fork vibrator. This vibration is parallel to the X axis and is referred to as driving vibration, When an angular velocity is applied to the Y axis, each of the arms 12 vibrates in opposite directions due to Coriolis force as shown in FIG. 1B. This vibration is parallel to the Z axis and is referred to as detecting vibration. It is possible to sense an angular velocity about the Y axis when detecting electrodes (not shown) sense the detecting vibration.

Figure 3A:
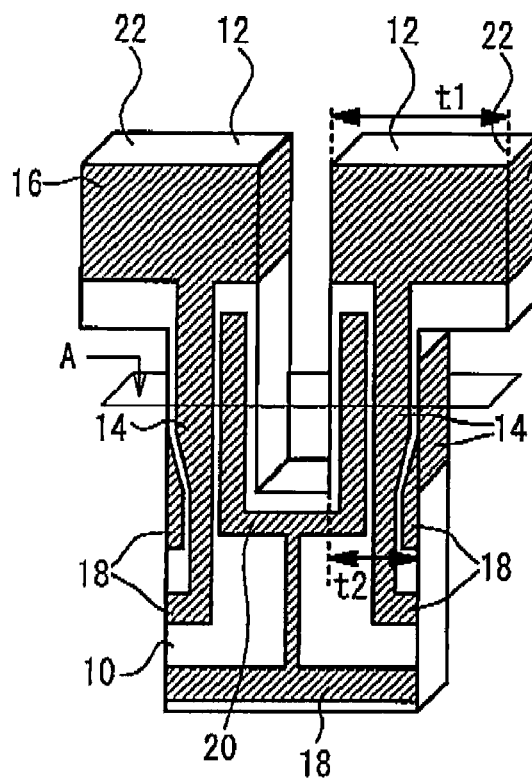
FIGS. 3A and 3B are perspective views of a front surface and a back surface of a tuning-fork vibrator of an angular velocity sensor in accordance with a first embodiment.
Figure 3B:
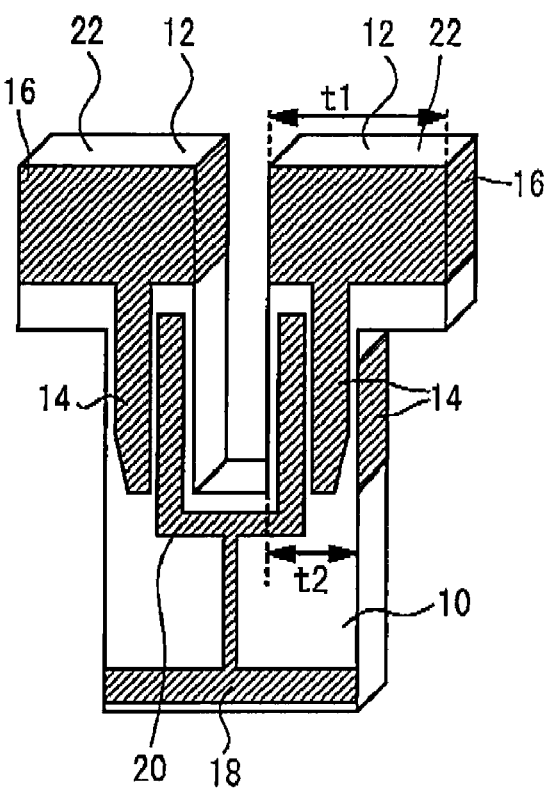

FIGS. 2A and 2B are respectively perspective views of a front and a back surface of a tuning-fork vibrator of an angular velocity sensor in accordance with a first comparative example. FIGS. 3A and 3B are respectively perspective views of a front and a back surface of the tuning-fork vibrator of the angular velocity sensor in accordance with the first embodiment. FIGS. 4A and 4B are respectively perspective views of a front and a back surface of a tuning-fork vibrator of an angular velocity sensor in accordance with a first variation of the first embodiment. It is assumed that the front surface of a tuning-fork vibrator is an X-Y plane, the back surface of a tuning-fork vibrator is another X-Y plane opposite to the front surface, and the side surfaces of a tuning-fork vibrator are Y-Z planes.

Referring to FIGS. 2A and 2B, the tuning-fork vibrator of the angular velocity sensor in accordance with the first comparative example is composed of a base 10 and two anus 12 extended from the base 10. The arms 12 are caused to have driving vibration Detecting electrodes 14 are provided on the front, back and side surfaces of the arms 12, The detecting electrodes 14 provided on the front and back surfaces of the arms 12 are connected together via electrodes 16, and those of provided on the front and side surfaces are connected to extraction electrodes 18. Driving electrodes 20 are provided on the front and back surfaces of the base 10 and arms 12 and are connected to the extraction electrodes 18. The base 10 and the arms 12 are formed of a piezoelectric material of $LiNbO_3$ lithium niobate), and the detecting electrodes 14 and the driving electrodes 20 are formed with metal films of Au (gold) with an underlying layer formed by an alloyed film of Ni (nickel) and Cr (chromium).

FIGS. 3A and 3B show the tuning-fork vibrator of the angular velocity sensor in accordance with the first embodiment. A free-end part 22 of each of the arms 12 away from the base 10 has a width t1 in the X-axis direction, which is twice as much as a width t2 of a fixed-end part of the arm 12 close to the base 10. The free-end parts 22 protrude from side surfaces of the arms 12 opposite to side surfaces that face each other via a space so that the arms 12 have steps in the free-end parts 22. The length of the free-end parts 22 in the Y-axis direction is half of that of the arm 12 in the Y-axis direction. The other structure of the first embodiment is the same as that of the first comparative example shown in FIGS. 2A and 2B.

FIGS. 4A and 4B show a tuning-fork vibrator of an angular velocity sensor in accordance with a first variation of the first embodiment. The width t1 of the free-end parts of the arms 12 away from the base 10 has a length equal to 1.5 times the width t2 of the fixed-end parts of the arms 12 close to the base 10. The other structure of the first variation of the first embodiment is the same as that of the first embodiment shown in FIGS. 3A and 3B.

Figure 5A:
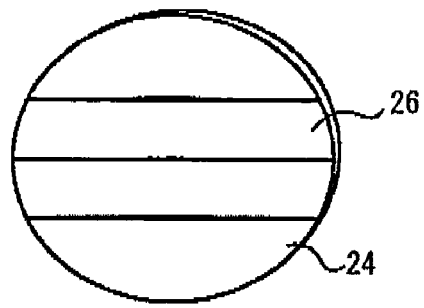
FIGS. 5A through 5D are perspective views that respectively show a method of fabricating the tuning-fork vibrator of the angular velocity sensor in accordance with the first embodiment.

A method of fabricating the angular velocity sensor in accordance with the first embodiment is explained with reference to FIGS. 5A through 5D. Referring to FIG. 5A, a substrate 24 formed of $LiNbO_3$ is cut into rectangular pieces 26 by dicing with a dicing saw.

Figure 5B:
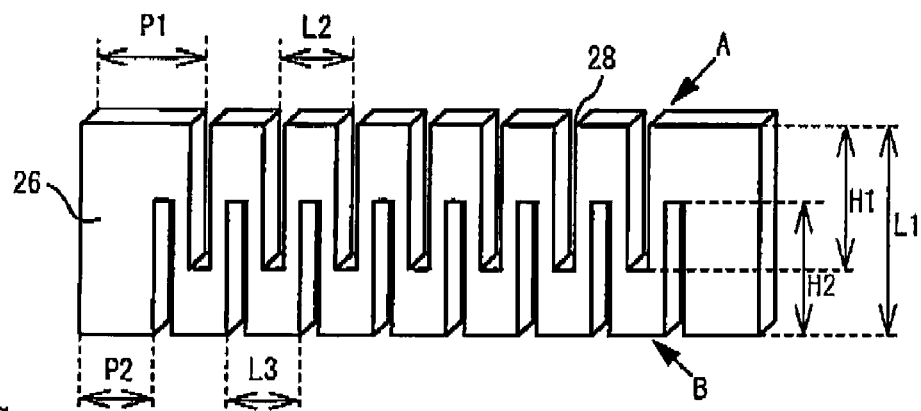

Referring to FIG. 5B, grooves 28 are formed by dicing with a dicing saw having a blade width of 400 μm from the sides A and B of the rectangular piece 26 opposite to each other in the short-side direction of the rectangular piece 26. The grooves 28 are formed so as to have lengths H1 and H2 from the sides A and B, in which the lengths H1 and H2 are two-thirds of a length L1 of the short sides of the rectangular piece 26. The grooves 28 extending from sides A and B are arranged alternatively in the longitudinal direction at fixed intervals of 150 μm. More specifically, a distance P1 from the short-side edge of the rectangular piece 26 to the closest groove 28 on the side A in the longitudinal direction is 500 μm longer than a distance P2 from the above short-side edge of the rectangular piece 26 to the closest groove on the side B. Further, a pitch L2 between two adjacent grooves 28 on the side A and a pitch L3 between two adjacent grooves 28 on the side B axe both equal to 1100 μm. Furthermore, two adjacent grooves 28 on the side B are arranged symmetrically about the groove 28 on the side A interposed therebetween. That is, the center of the groove 28 on the side A is overlapped with the center of the space between the two adjacent grooves 28 on the side B.

Figure 5C:
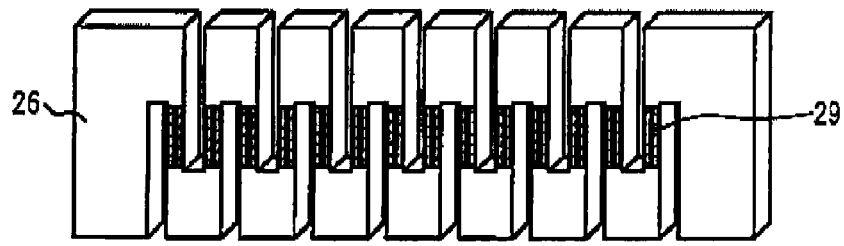
Figure 5D:
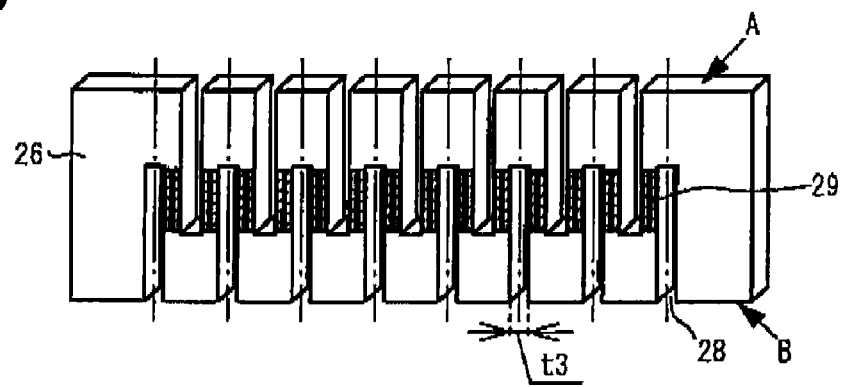

Referring to FIG. 5C, electrode patterns 29 such as driving electrodes and detecting electrodes are formed on the rectangular piece 26 by the exposure technique. The electrode patterns 29 shown in FIG. 5C are only parts of the electrode patterns formed on the arms 12. With reference to FIG. 5D, the rectangular piece 26 is divided into pieces on the centers of the widths t3 of the grooves 28 on the side B by dicing with a dicing saw having a blade width of 100 μm. The pieces are the tuning-fork vibrators of the angular velocity sensors in accordance with the first embodiment shown in FIGS. 3A and 3B.

Figure 6:
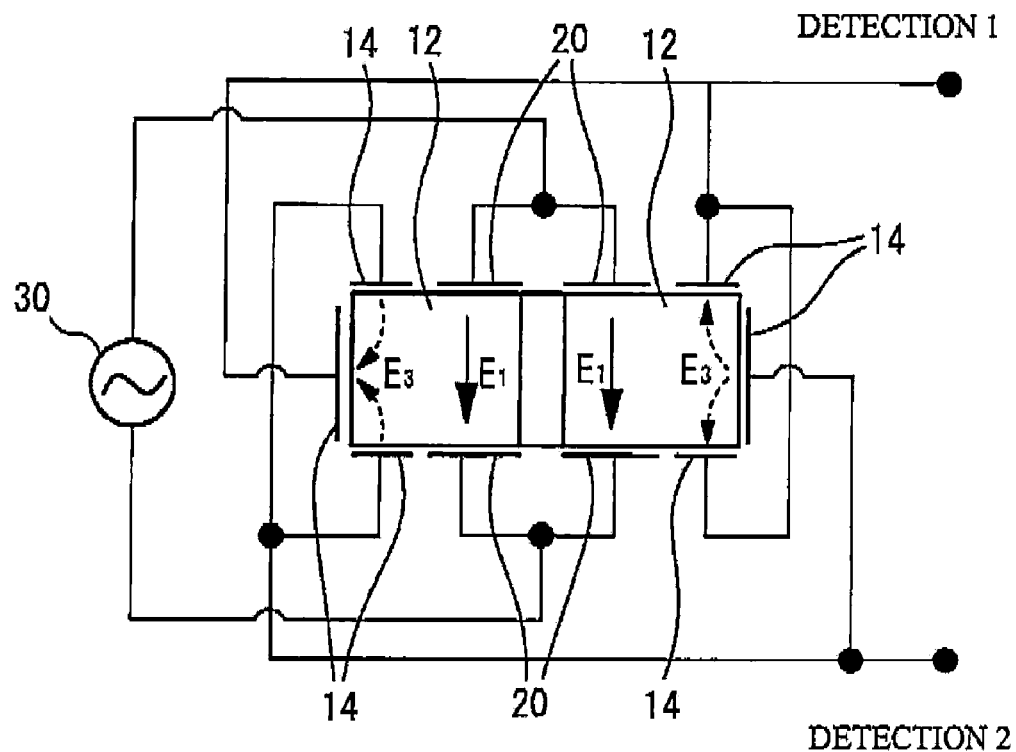
FIG. 6 is a cross-sectional view taken along a line A shown in FIG. 3A, in which the tuning-fork vibrator of the angular velocity sensor is connected to a drive power source in accordance with the first embodiment.

FIG. 6 schematically shows the tuning-fork vibrator of the angular velocity sensor in accordance with the first embodiment to which a drive power supply 30 is connected. FIG. 6 shows an X-Z cross-sectional view of the tuning-fork vibrator that is taken along a line A in FIG. 3A and is viewed from the side of the vibrator opposite to the side on which the base 10 is provided. Referring to FIG. 6, the driving electrodes 20 provided on the front and back surfaces of the arm 12 are connected to the drive power supply 30. The detecting electrodes 14 provided on the front and back surfaces of one of the arms 12 are connected to detection 2, and the detecting electrodes 14 on the side surfaces thereof are connected to detection 1. The detecting electrodes 14 located on the front and back surfaces of the other arm 12 are connected to detection 1, and the detecting electrodes 14 on the side surface of the arm 12 are connected to detection 2. When a drive signal, which may be an alternating signal, is applied to the driving electrodes 20, electric fields E1 are generated in the arms 12 in the same direction between the driving electrodes 20 of the front and back surfaces of the arms 12. Thus, the aims 12 are caused to have driving vibration. When an angular velocity is applied to the Y axis, detecting vibration is generated. The detecting vibration results in electric fields E3 in the arms 12. The electric fields E3 have a direction from the electrodes 14 connected to detection 2 to those connected to detection 1. Detecting electrodes 14 sense charges generated by the electric fields E3. It is thus possible to detect an angular velocity about the Y axis. The sense signals that appear at detection 1 and detection 2 are opposite phase signals.

Figure 7:
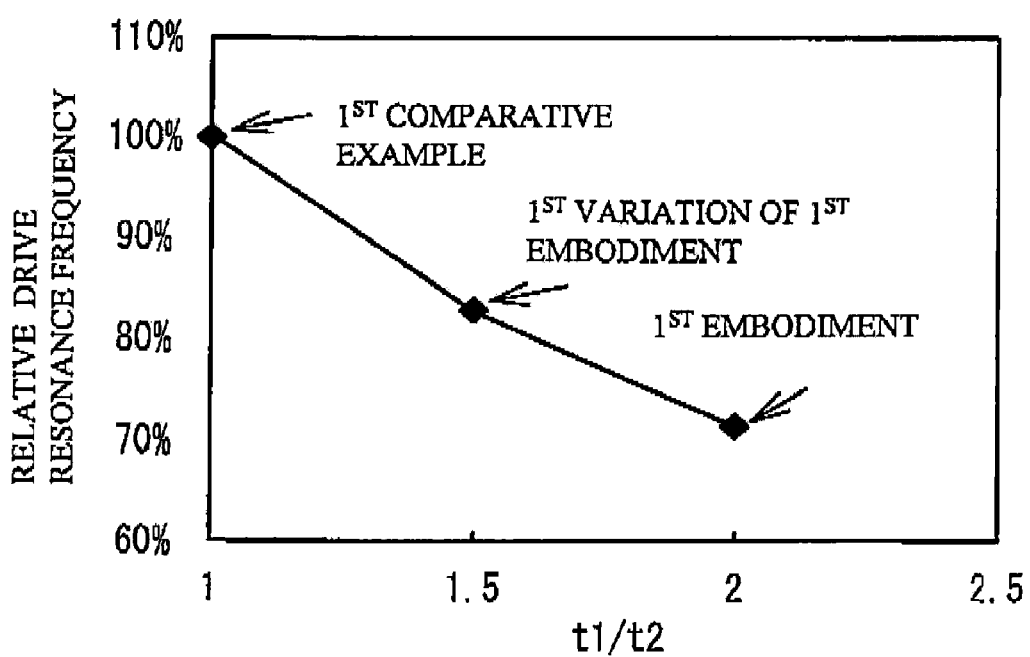
FIG. 7 shows results of simulating effects on a driving resonance frequency by a width t1 of free-end parts of arms.

FIG. 7 shows results of simulating effects on the driving vibration frequency by the width t1 of the free-end parts 22 of the arms 12. The horizontal axis of FIG. 7 denotes the width t1 of the free-end parts 22 of the arms 12 normalized by the width t2 of the parts of the arms 12 connected to the base 10. The vertical axis of FIG. 7 denotes the driving vibration frequency normalized by the drive resonance frequency of the first comparative example (relative drive resonance frequency). Referring to FIG. 7, it is clear that the first variation of the first embodiment has a lower drive resonance frequency than that of the first comparative example. Further, the drive resonance frequency of the first embodiment is lower than that of the first embodiment. The widths t1 and t2 of the first comparative example are the same. The width t1 of the first variation of the first embodiment is 1.5 times as much as the width t2, and the width t1 of the first embodiment is twice the width t2. This explains that the drive resonance frequency is decreased by setting the width t1 of the free-end parts 22 of the arms 12 greater than the width t2 of the fixed-end parts of the arms 12. The following Formula 1 describes the sensitivity of the angular velocity sensor. A $\omega_{drive}$ in the Formula 1 denotes the drive resonance frequency. It can be seen from Formula 1 that the sensitivity of angular velocity is inversely proportional to the drive resonance frequency. FIG. 7 shows that the drive resonance frequency of the first embodiment can be made lower than that of the comparative example. Thus, the first embodiment has improved sensitivity of angular velocity, as compared to the first comparative example.

$$FM(sensitivity) = V_{detect}/\Omega_0 \approx j2 * A_{drive} * A_{detect} * Q_{detect} * \{1/(Cd_{detect} * SO_{detect})\} * Q_{drive}/\omega_{drive} * V_{drive}$$ [Formula 1]

$A_{drive}$ and $A_{detect}$ denote electromechanical coupling coefficients involved in drive and detect, respectively. $Q_{drive}$ and $Q_{detect}$ denote resonance Q values involved in drive and sense, respectively. $Cd_{detect}$ denotes the electrostatic capacitance on the detect side. $SO_{detect}$ denotes the equivalent stiffness on the detect side, and $V_{drive}$ denotes the drive voltage.

Figure 8:
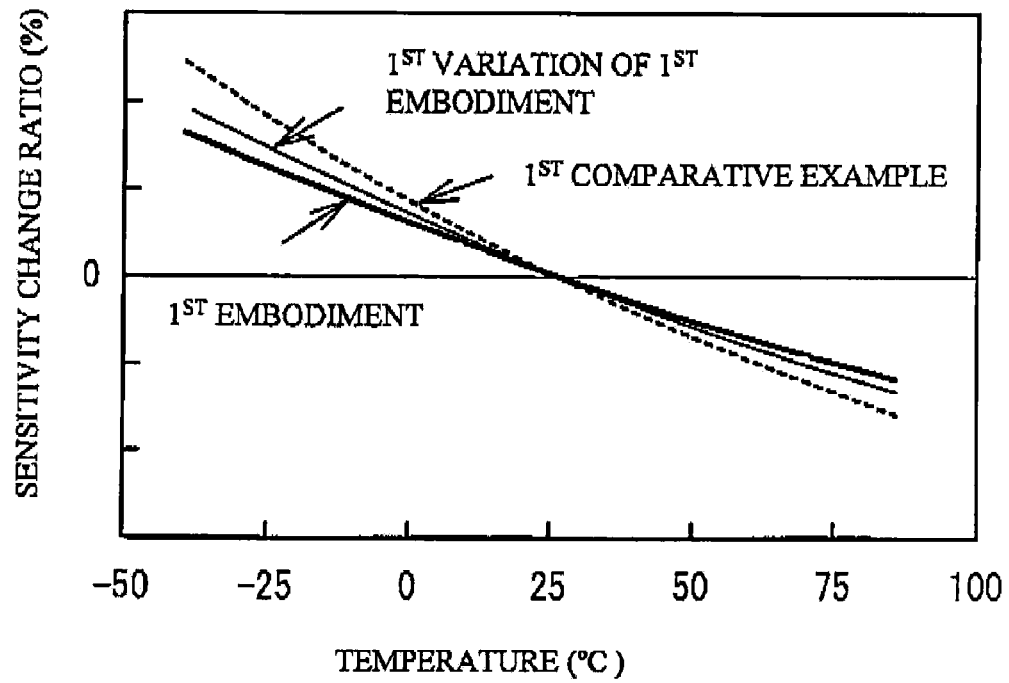
FIG. 8 shows results of simulating a sensitivity change ratio as a function of change of temperature.

FIG. 8 shows results of simulating the sensitivity change ratio as a function of change of temperature. The horizontal axis denotes temperature and the vertical axis denotes the sensitivity change ratio normalized by the sensitivity at a temperature of 25° C. A broken line represents the first comparative example, a bold solid line represents the first embodiment, and a thin solid line represents the first variation of the first embodiment. It can be seen from FIG. 8 that the sensitivity change ratio of the first comparative example is most influenced by the temperature, and that the sensitivity change ratios of the first variation of the first embodiment and the first variation become smaller in this order. That is, the sensitivity change ratio by temperature change decreases as the width t1 of the free-end parts 22 of the arms 12 that is greater than the width t2 of the fixed-end parts of the arms 12 connected to the base 10 increases.

The above simulation results may be explained as follows. The drive resonance frequency decreases as the width t1 greater than the width t2 increases, as shown in FIG. 7. The change ratio of the drive resonance frequency as a function of the change of temperature is constant, so that the change ratio of the sensitivity of the angular velocity sensor inversely proportional to the drive resonance frequency is also constant to the change of temperature as shown by Formula 1. The sensitivity of the angular velocity sensor of the first embodiment is the highest, since the drive resonance frequency is the smallest. The sensitivity of the angular velocity sensor also depends on the difference between the drive resonance frequency and the detect resonance frequency (hereinafter, the difference is referred to as a frequency difference). When the frequency difference increases, the sensitivity of the angular velocity sensor decreases. The detect resonance frequency is the resonance frequency in the detecting vibration mode in FIG. 1B. When the angular velocity sensors of the first embodiment, the first variation of the first embodiment, and the first comparative example are adjusted so as to have an identical sensitivity, the first embodiment has the greatest frequency difference. Since the frequency difference changes constantly along with temperature, the first embodiment having a great frequency difference has a small ratio of change of the frequency difference caused by temperature change with reference to the frequency difference at a temperature of 25° C. When the angular velocity sensor of the first embodiment, the first variation of the first embodiment, and the first comparative example are adjusted so as to have an identical sensitivity of angular velocity, the first embodiment has the smallest ratio of change in sensitivity. In contrast, the first comparative example having the smallest sensitivity of angular velocity has a small frequency difference, and thus, has a large ratio of change of the frequency difference caused by temperature change with reference to the frequency difference at a temperature of 25° C. Thus, the first comparative example has a large change ratio of sensitivity of angular velocity.

Figure 9:
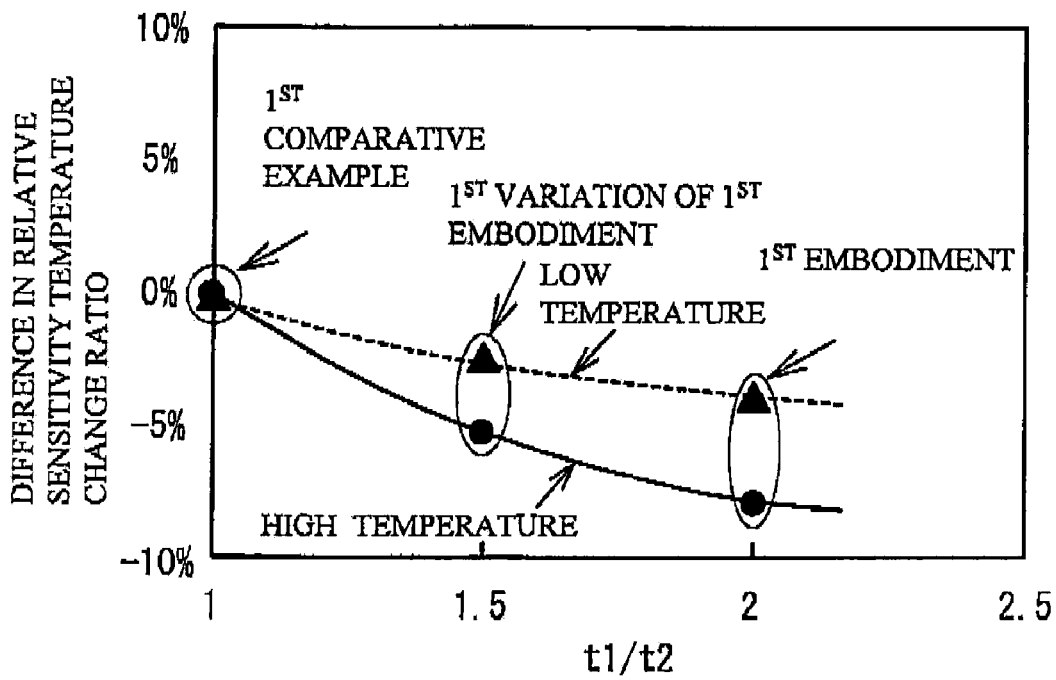
FIG. 9 shows results of simulating effects on a sensitivity-temperature change ratio affected by the width t1 of the free-end parts of the arms when the temperature changes from room temperature (+25° C.) to high temperature (+85° C.) and from room temperature to low temperature (−40° C.)

FIG. 9 shows results of simulating effects on the sensitivity-temperature change ratio affected by the width t1 of the free-end parts 22 of the arms 12 when the temperature changes from room temperature (+25° C.) to high temperature (+85° C.) and from room temperature to low temperature (40° C.). The horizontal axis of the graph is the width t1 of the free-end parts 22 of the arms 12 normalized by the width t2 of the fixed-end parts of the arms 12 connected to the base 10, and the vertical axis is a difference in the sensitivity-temperature change ratio obtained when the temperature changes from room temperature to high temperature and that obtained when the temperature changes from room temperature to low temperature with reference to the sensitivity-temperature change ratio of the first comparative example (difference in the relative sensitivity-temperature change ratio). The difference in the sensitivity-temperature change ratio has a minus sign when it has a smaller change ratio than that of the first comparative example, and has a plus sign when it has a greater change ratio than that of the first comparative example. A broken line denotes the sensitivity-temperature change ratio when the temperature changes from room temperature to low temperature, and a solid line denotes when the temperature changes from room temperature to high temperature. That is, the greater the width t1 than the width t2 is, the smaller the sensitivity change is. This means that the difference in the sensitivity-temperature change ratio obtained when the temperature changes from room temperature to high temperature and that obtained when the temperature changes from room temperature to low temperature are both minus. The reason for the above simulation results is similar to that of in FIG. 8.

Figures 10A, 10B:
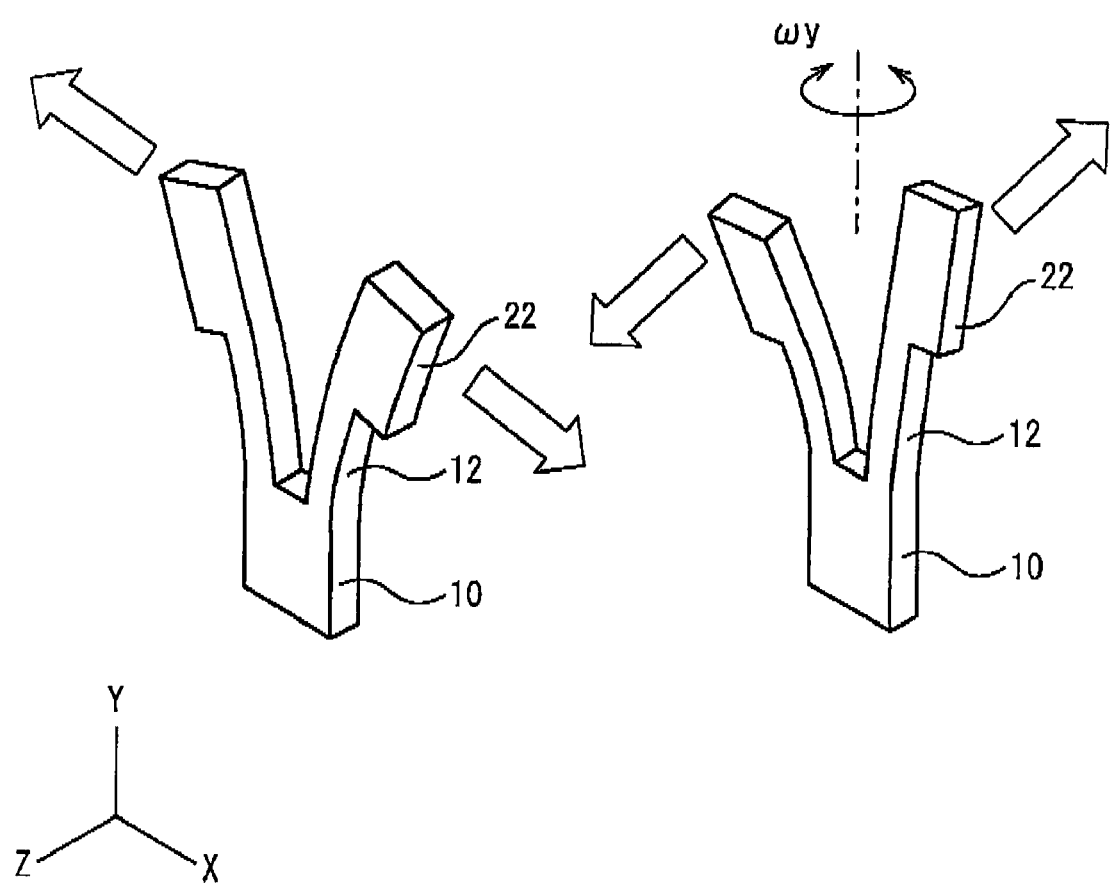

In accordance with the first embodiment, as shown in FIGS. 3A and 3B, the arms 12 driven to vibrate have free-end parts 22 having the width t1 greater than the width t2 of the fixed-end parts connected to the base 10, Thus, the free-end parts 22 of the arms 12 have a respective increased mass, and increased inertia force is available in driving vibration shown in FIG. 10A. It is thus possible to improve the efficiency of driving vibration to the drive signal, that is, drive efficiency. The improved drive efficiency increases detecting vibration generated when an angular velocity about the Y axis as shown in FIG. 10B, that is, the longitudinal direction of the arms 12. Accordingly, it is possible to improve detection sensitivity of angular velocity about the Y axis.

The above-mentioned exemplary structure of the first embodiment has free-end parts 22 that protrude from the outer side surfaces of the arms 12 opposite to the inner side surfaces that face each other via a space, as shown in FIGS. 3A and 3B. There are other exemplary structures. For example, the free-end parts 22 may protrude inwards from the inner side surfaces of the arms 12 so as to face each other or may protrude from the front or back surfaces of the arms 12. In these structures, the width t1 is greater than the width t2, so that the inertia force in driving vibration can be increased and drive efficiency can be improved.

Furthermore, as shown in FIGS. 3A and 3B, each of the arms 12 has the step in the respective free-end parts 22. Thus, the width t1 is greater than the width 12 and the free-end parts 22 have an increased mass, so that the inertia force in driving vibration can be increased and the drive efficiency can be improved.

As shown in FIGS. 5A through 5D, the substrate 24 of $LiNbO_3$ is cut into the rectangular pieces 26. The grooves 28 are formed by dicing. The grooves 28 lave a length equal to two-thirds of the length L1 in the short-side direction of the rectangular piece 26, and are formed on the opposite sides A and B by turns at the given intervals. The rectangular piece 26 is divided by dicing with a dicing blade narrower than the grooves 28 at the center of the width t3 of the grooves 28 on the side B. It is thus possible to easily produce the tuning-fork vibrator having the free-end parts 22 of the arms 12 having the width t1 greater than the width t2 with excellent mass productivity even for $LiNbO_3$, which is high electromechanical coupling coefficient piezoelectric single crystal that has difficulty in process by chemical etching.

FIG. 5B exemplarily shows that the grooves 28 having a length of two-thirds of the length L1 of the rectangular piece 26 in the short-side direction alternately extend from the sides A and B of the rectangular piece 26 opposite to each other in the short-side direction. The present invention is not limited to the above, but may include an arrangement in which the sum of the heights H1 and H2 of the grooves 28 is equal to or more than half of the length L1 of the rectangular piece 26 in the short-side direction. That is, the sum of the height H1 and H2 should be greater than the length L1 of the rectangular piece 26 in the short-side direction. It is thus possible to obtain the tuning-fork vibrator having the width t1 of the free-end parts of the arms 12 that is greater than the width t2 of the fixed-end parts thereof. It is possible to employ another arrangement in which the grooves 28 having a length greater than half of the length in the long-side direction of the rectangular piece 26 alternately extend from the two sides opposite to each other in the long-side direction. That is, the grooves may be formed on one of pairs of the opposite sides of the rectangular piece 26 so as to have, a length equal to or greater than half of the distance between the pair of opposite sides.

FIG. 5B exemplarily shows that the grooves 28 that alternately extend from the opposite sides A and B in the short-side direction of the rectangular piece 26 are arranged at the predetermined constant pitches in the long-side direction. It is to be noted that the alternative arrangement of the grooves 28 is not limited to the constant pitches. However, in view of mass productivity, it is preferable to arrange the interleaving grooves 28 at the predetermined constant pitches.

FIG. 5B exemplarily shows that the two adjacent grooves 28 on the side A of the rectangular piece 26 are arranged symmetrically about the groove 28 on the side A interposed between the two adjacent grooves 28. It is to be noted that the present invention is not limited to the above arrangement. However, it is preferable to employ the above arrangement because the two arms 12 having the driving vibration have an identical width and well-balanced amplitudes in vibration.

FIG. 5D exemplarily shows that the rectangular piece 26 are divided in the center of the width t3 of the grooves 28. The present invention is not limited to the above but may include another arrangement in which the rectangular piece 26 is divided so that the free-end parts 22 of the two arms 12 having the driving vibration have an identical width t1. Even in this arrangement the tuning-fork vibrator vibrates with well-balanced amplitudes. However, it is preferable to divide the rectangular piece 26 in die center of the width t3 of the grooves 28 in order to manufacture the tuning-form vibrators having well-balanced amplitudes without degrading the mass productivity.

FIGS. 5B and 5D exemplarily show the grooves 28 formed by the dicing saw having a width of 400 μm and the rectangular piece 26 is divided by the dicing saw having a width of 100 μm. The present invention is not limited to the above. The width of the dicing saw used to divide the rectangular piece 26 is required to be less than that of the dicing saw used to form the grooves 28. The dicing process using the dicing saws may be replaced by another dicing process using wire saws or a laser process.

FIG. 5B exemplarily shows that the grooves 28 formed from the two opposite sides A and B of the rectangular piece 26 in the short-side direction have an identical width. The present invention is not limited to the above, but may be another arrangement in which the width t3 (see FIG. 5D) of the grooves 28 on the side B is greater than that of the grooves 28 on the side A. Even in this arrangement, it is possible to obtain the tuning-fork vibrator having the free-end parts of the arms 12 having a comparatively great width t1.

The present invention is not limited to the base 10 and the arms 12 made of $LiNbO_3$ but may use $LiTaO_3$. Preferably, a material having a great electromechanical coupling coefficient is used because such a material improves the sensitivity of angular velocity sensor as described in Formula 1.

Second Embodiment

Figures 11A, 11B:
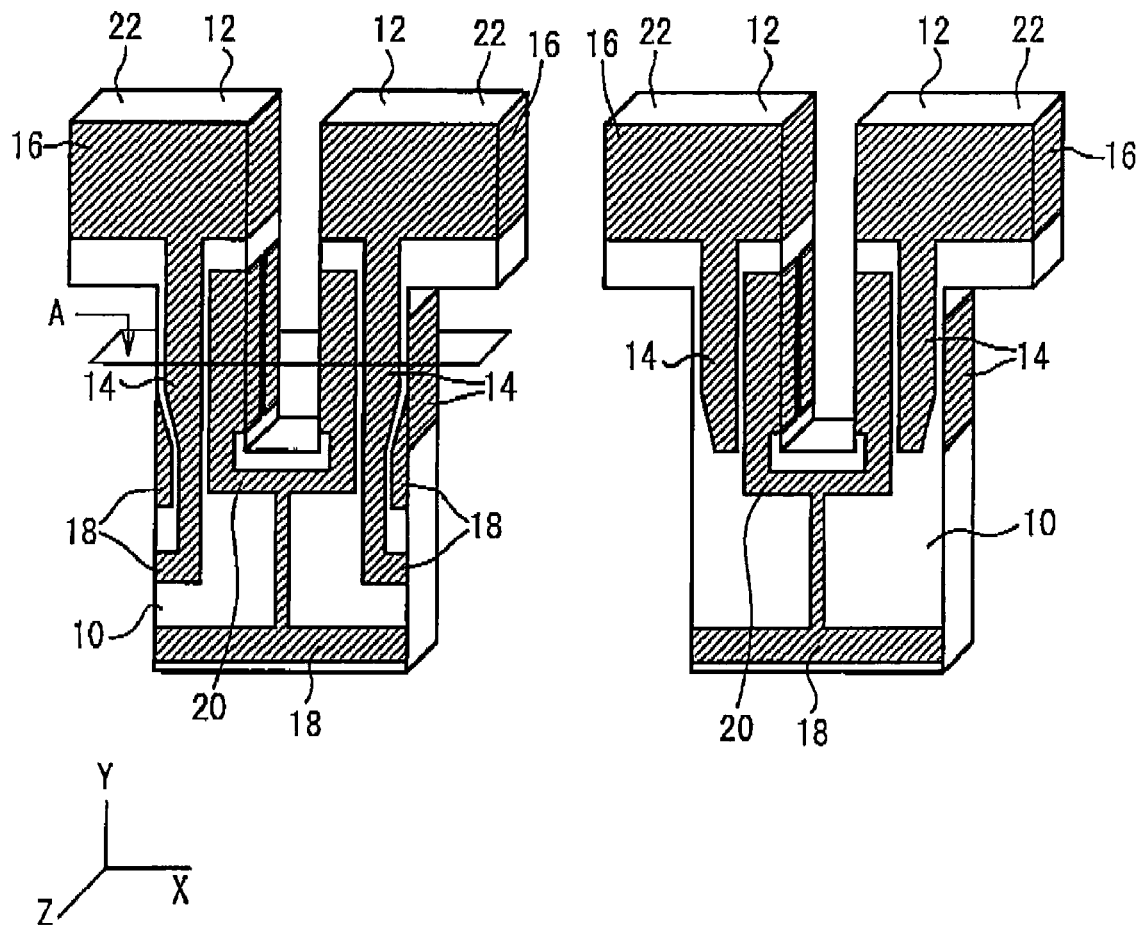
FIGS. 11A and 11B are perspective views of a front and a back surface of a tuning-fork vibrator of an angular velocity sensor in accordance with a second embodiment.

A second embodiment has an exemplary structure having the driving electrodes having an arrangement different from that of the driving electrodes of the angular velocity sensor of the first embodiment. FIG. 11A is a perspective view of a front surface of an angular velocity sensor of the second embodiment, and FIG. 11B is a perspective view of a back surface thereof. Referring to FIGS. 11A and 11B, driving electrodes 20 are provided so as to extend from the front and back surfaces of the two arms 12 driven to vibrate to the side surfaces that face each other. The other structure of the second embodiment is the same as that of the first embodiment.

Figure 12:
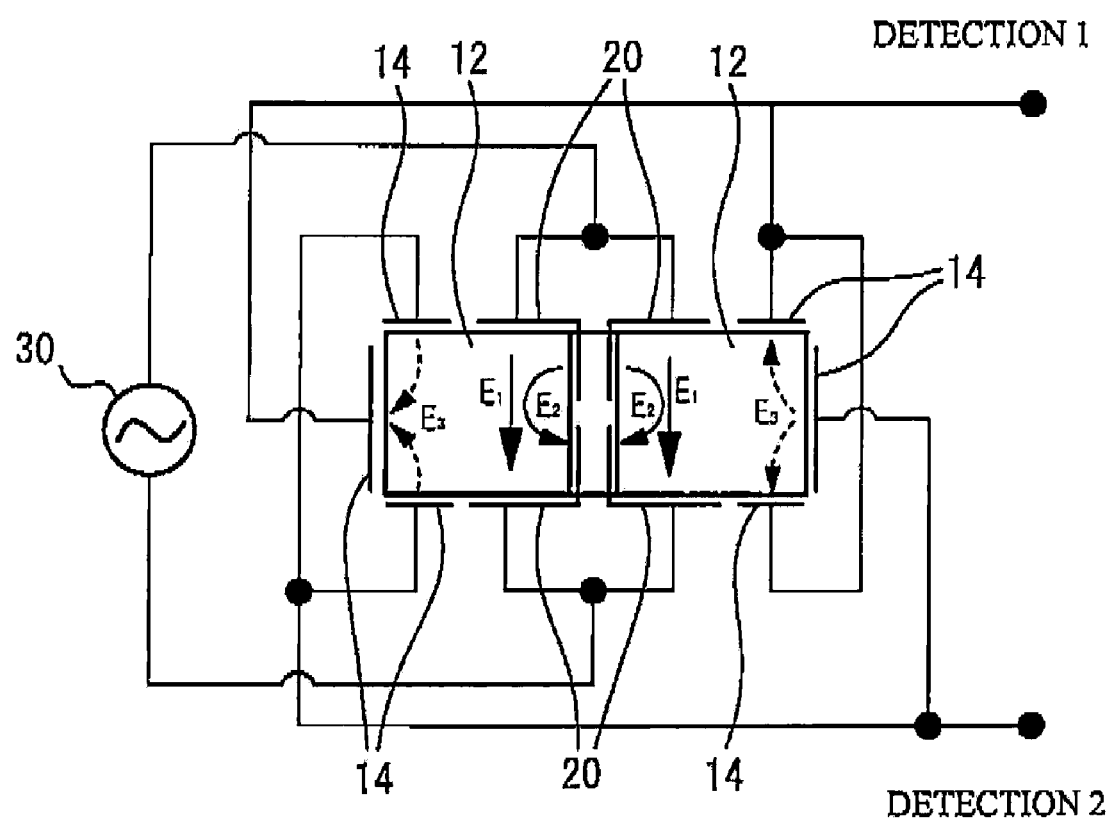
FIG. 12 is a cross-sectional view taken along a line A shown in FIG. 11A, in which the tuning-fork vibrator of the angular velocity sensor is connected to a drive power supply in accordance with the second embodiment.

FIG. 12 schematically shows the tuning-fork vibrator of the angular velocity sensor in accordance with the second embodiment to which the drive power supply 30 is connected. FIG. 12 shows an X-Z cross-sectional view of the tuning-fork vibrator that is taken along a line A in FIG. 11A and is viewed from the side of the vibrator opposite to the side on which the base 10 is provided. Referring to FIG. 12, the driving electrodes 20 are provided so as to extend from the front and back surfaces of the two arms 12 driven to vibrate to the side surfaces that face each other. Thus, when the drive signal, which may be an alternative signal, is applied to the driving electrodes 20, electric fields E2 generated from the side surfaces of the arms 12 are added to the electric fields E1 generated between the driving electrodes 20 on the front and back surfaces of the arms 12. The other structure of the second embodiment is the same as that of the first embodiment.

According to the second embodiment, as shown in FIG. 12, the electric fields E2 generated from the side surfaces of the arms 12 are added to the electric fields E1 generated between the driving electrodes 20 on the front and back surfaces of the arms 12. It is thus possible to obtain an increased densities of the electric fields between the driving electrodes 20 of the arms 12, as compared to the first embodiment. Thus, the second embodiment has a higher drive efficiency than the first embodiment.

The present invention is not limited to the above-mentioned arrangement of the driving electrodes 20 but may be arranged so that the driving electrodes 20 extend from the front and back surfaces of the arms 12 driven to vibrate to any of the side surfaces of the arms. Even with this arrangement, the densities of the electric fields generated between the driving electrodes 20 of the arms 12 can be enlarged and the drive efficiency can be improved. It is possible to employ yet another arrangement in which the driving electrodes 20 extend from the front and back surfaces of at least one of the two arms 12 to any of the side surfaces thereof. However; in order to realize excellent balanced amplitudes, it is preferable to employ the arrangement in which the driving electrodes 20 extend from the front and back surfaces of each of the two arms 12 to any of the side surfaces thereof.

Third Embodiment

Figure 13A:
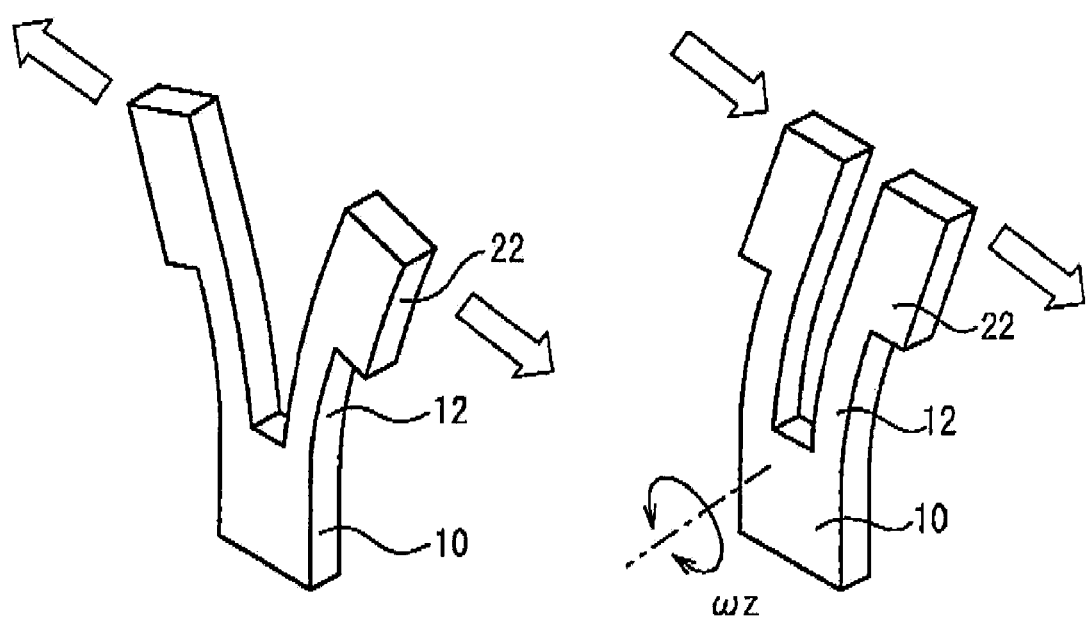
FIG. 13A shows a driving vibration by two arms.
Figure 13B:
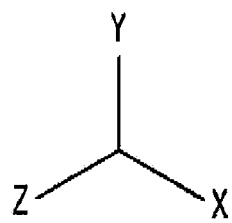

A third embodiment is an angular velocity sensor capable of detecting an angular velocity about the axis in the thickness direction of the arms 21, that is, the Z axis of the tuning-fork vibrator of the angular velocity sensor of the first embodiment. FIG. 13A shows driving vibration and FIG. 13B shows detecting vibration caused when an angular velocity about the Z axis.

Referring to FIG. 13A, driving vibration parallel to the X axis is generated so that the two arms 12 alternately become close to and away from each other. Referring to FIG. 13B, an angular velocity about the Z axis is applied, the arms 12 have detecting vibration in which the arms 12 vibrate in an identical direction in parallel with the X axis. The detecting electrodes (not shown) sense the detecting vibration, so that the angular velocity about the Z axis can be detected.

Figure 14:
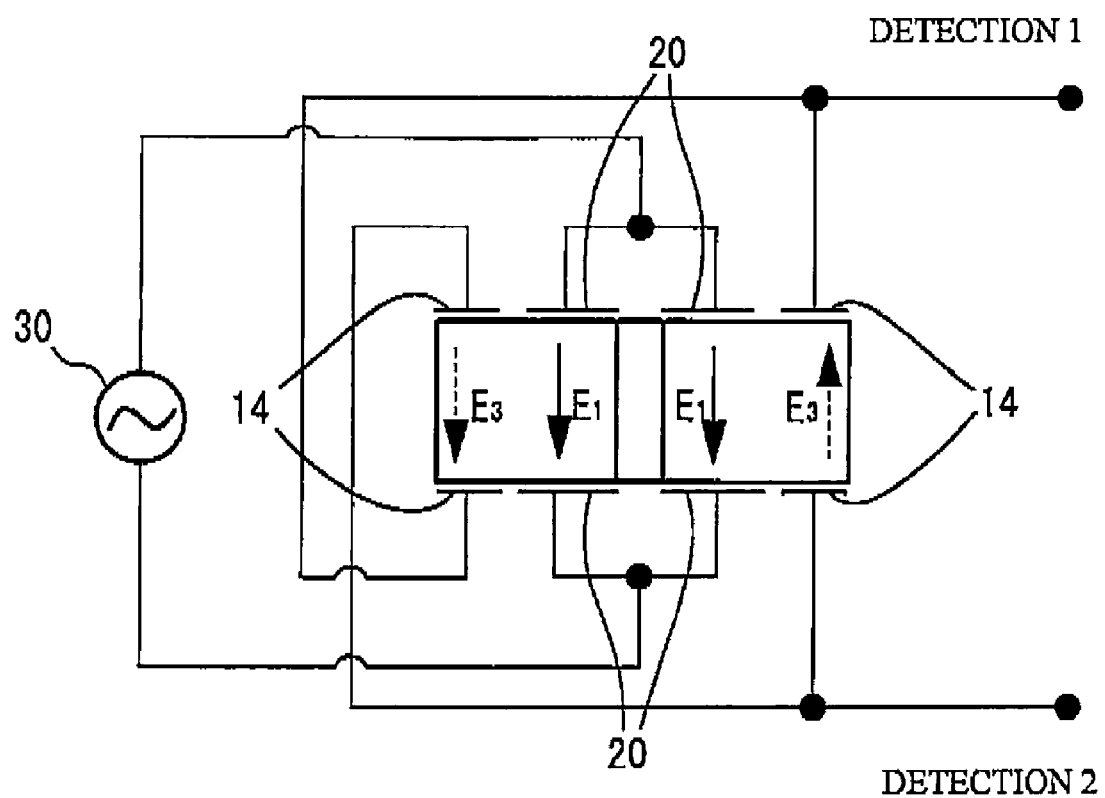
FIG. 14 is a cross-sectional view of a tuning-fork vibrator of an angular velocity sensor connected to a drive power supply in accordance with a third embodiment.

FIG. 14 schematically shows the tuning-fork vibrator of the angular velocity sensor in accordance with the third embodiment to which the drive power supply 30 is connected. The driving electrodes 20 provided on the front and back surfaces of the arms 12 are connected to the drive power supply 30. The detection electrode 14 provided on the front surface of one of the arms 12 is connected to detection 2, and the detection electrode 14 provided on the back surface thereof is connected to detection 1. The detection electrode 14 provided on the front surface of the other arm 12 is connected to detection 1, and the detection electrode 14 provided on the back surface thereof is connected to detection 2. When the drive signal is applied to the driving electrodes 20, the electric fields E1 are generated between the driving electrodes 20 on the front and back surfaces of the arms 12, so that the arms 12 are caused to vibrate. When an angular velocity is applied about the Z axis, detecting vibration is generated and results in electric fields E3 in the arms 12 oriented from the detecting electrodes 14 connected to detection 2 to the detecting electrodes 14 connected to detection 1. The resultant charges are sensed via the detecting electrodes 14, so that the angular velocity about the Z axis can be detected. The sense signals obtained via the detections 1 and 2 are opposite phase signals.

According to the third embodiment, the increased width t1 of the free-end parts of the arms 12 increases the mass and inertia force, and improves the sensitivity of angular velocity about the axis in the thickness direction of the arms 12. Since the angular velocity sensor of the third embodiment is capable of sensing the angular velocity about the Z axis, the tuning-fork vibrator can be horizontally housed in a package of the angular velocity sensor. It is thus possible to realize a reduced height of the angular velocity sensor, as compared to the first embodiment capable of sensing angular velocity about the Y axis.

Figure 15:
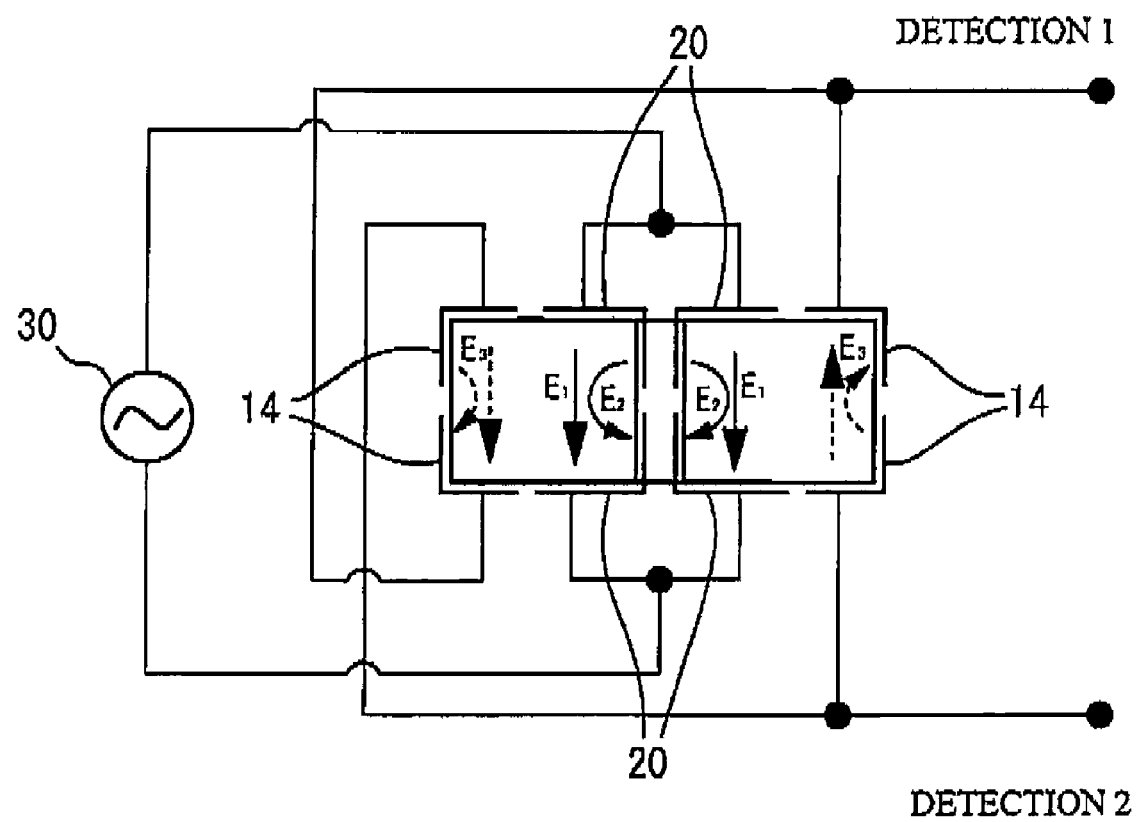
FIG. 15 is a cross-sectional view of the tuning-fork vibrator of the angular velocity sensor when another electrode arrangement is employed.

Even in the third embodiment as shown in FIG. 15, the densities of the electric fields generated in the arms 12 between the driving electrodes 20 can be increased by arranging the driving electrodes 20 so as to extend from the front and back surfaces of the arms 12 to the side surfaces that face each other as in the case of the second embodiment. Thus, the drive efficiency can be improved. Further, the densities of the electric fields E3 generated between the detecting electrodes 14 due to detecting vibration can be enhanced by arranging the detecting electrodes 14 so as to extend from the front and back surfaces of the arms 12 to outer side surfaces opposite to the inner side surfaces that face each other. It is thus possible to further improve sensing of angular velocity about the Z axis.

Fourth Embodiment

Figure 16A:
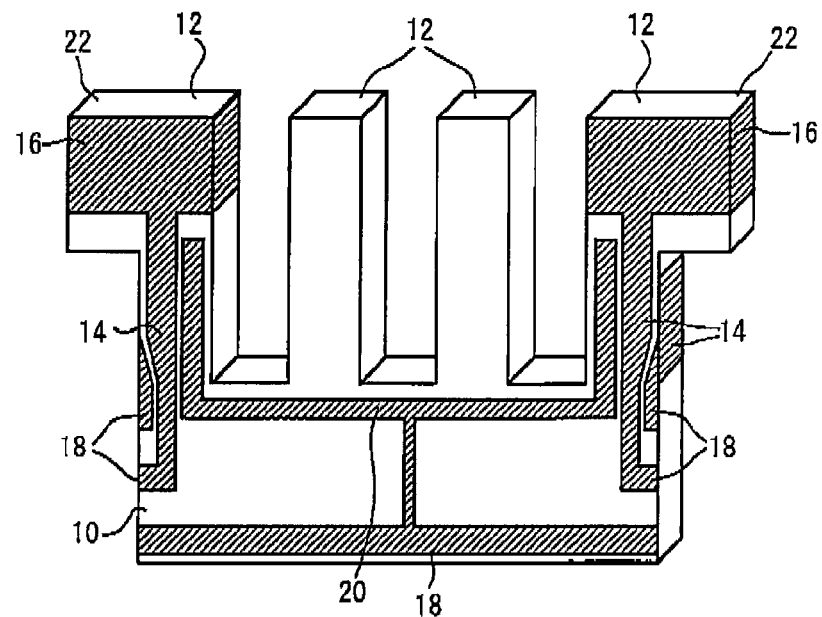
FIGS. 16A and 16B are perspective views of a front and a back surface of a tuning-fork vibrator of an angular velocity in accordance with a fourth embodiment.

A fourth embodiment is an exemplary angular velocity sensor with a tuning-fork vibrator that is equipped with four arms 12 and is capable of sensing angular velocity about the Y axis, that is, the axis in the longitudinal direction of the arms 12. FIG. 16A is a perspective view of a front surface of a tuning-fork vibrator employed in the fourth embodiment, and FIG. 16B is a perspective view of a back surface thereof.

Figure 16B:
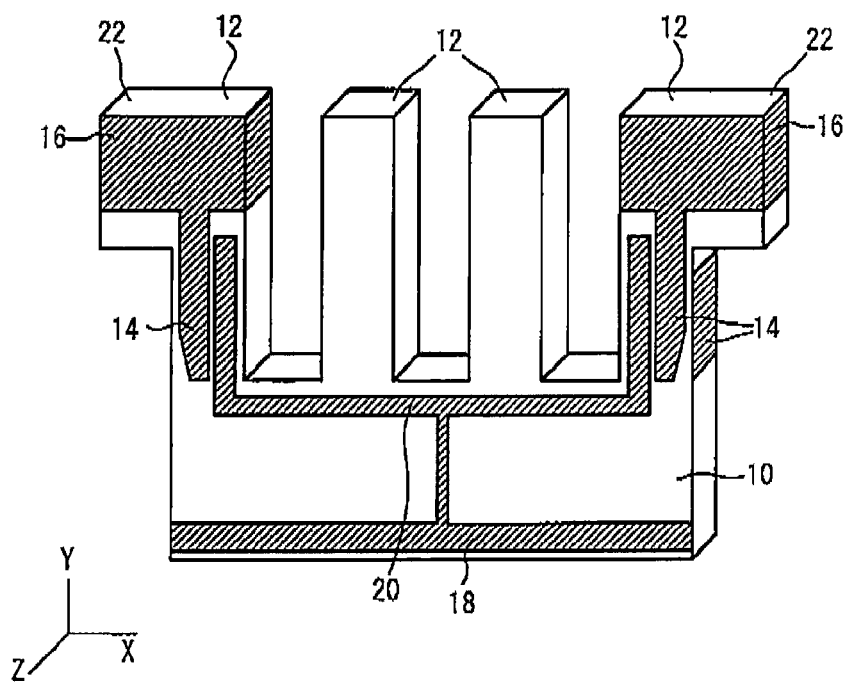

Referring to FIGS. 16A and 16B, two outer arms 12 out of the four arms 12 and the base 10 are substantially the same as those of the tuning-fork vibrator of the first embodiment, as shown in FIGS. 3A and 3B.

A description will now be given, with reference to FIGS. 17A through 17C, of a method for fabricating the angular velocity sensor in accordance with the forth embodiment. The substrate 24 of LiNbO$_3$ is cut into the rectangular piece 26 in the same manner as that of the first embodiment, and a description thereof will be omitted here.

Figure 17A:
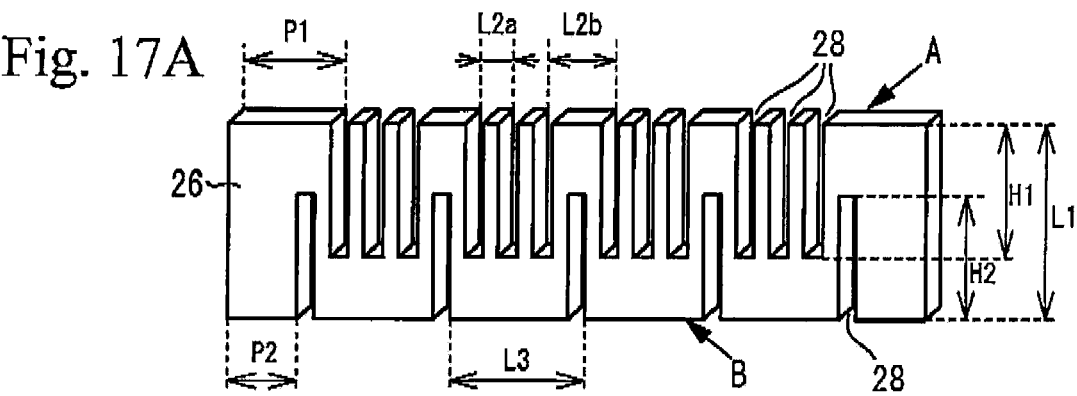
FIGS. 17A through 17C are perspective views that respectively show a method of fabricating the tuning-fork vibrator of the angular velocity sensor in accordance with the fourth embodiment.

Referring to FIG. 17A, the grooves 28 are formed so that three grooves 28 are provided on the side A between two adjacent grooves 28 on the side B opposite to the side A in the short-side direction of the rectangular piece 26. The grooves 28 may be formed by using a dicing saw having a blade width of 400 μm. The three grooves 28 on the side A are arranged symmetrically about the center of the distance between the two adjacent grooves 28 on the side B. The length H1 of the grooves 28 on the side A and the length H2 of the grooves 28 on the side B are formed so as to become equal to two-thirds of the length L1 of the rectangular piece 26 in the short-side direction. A distance P1 from an end of the rectangular piece 26 to the groove 28 on the side A closest to the above end in the long-side direction is 550 μm longer than a distance P2 from the above end to the groove 28 on the side B closest to the above end in the long-side direction. The grooves 28 may be formed so that the intervals L2a and L2b related to the grooves 28 on the side A are, for example, 550 μm and 1100 μm, respectively, and the intervals L3 related to the grooves 28 on the side B are, for example, 2200 μm.

Figure 17B:
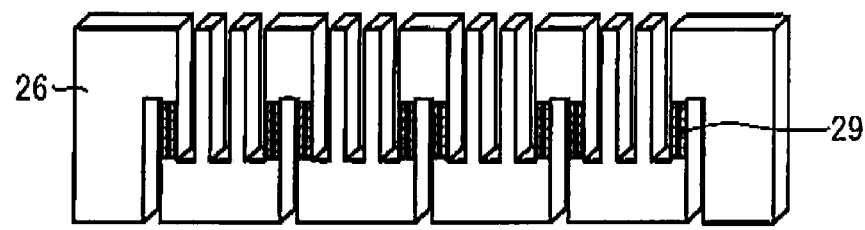
Figure 17C:
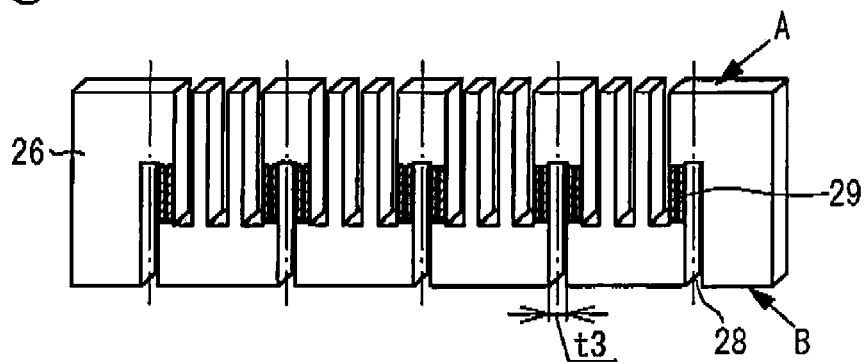

Referring to FIG. 17B, the electrode patterns 29 for the driving electrodes and the detecting electrodes are formed on the rectangular piece 26 by using the exposure technique. In FIG. 17B, only some electrode patterns 29 formed on portions of the rectangular piece 26 corresponding to the arms 12 are illustrated for the sake of simplicity. Referring to FIG. 17C, the rectangular piece 26 is divided by a dicing process using a dicing saw having a blade width of 100 μm in the center of the width t3 of the grooves 28 formed on the side B. Thus, the tuning-fork vibrator for the angular velocity sensor of the fourth embodiment can be obtained, as shown in FIGS. 16A and 16B.

FIG. 18A shows driving vibration, and FIG. 18B shows detecting vibration generated when an angular velocity about the longitudinal direction of the arms 12 is applied, Referring to FIG. 18A, the drive signal is applied to the driving electrodes (not shown) formed on the two outer arms 12, which are thus driven to vibrate in parallel with the X axis. The two inner arms 12 are driven to vibrate in parallel with the X axis so as to be counter-balanced with the two outer arms 12. That is, the two outer arms 12 and the two inner arms 12 are driven to vibrate in opposite phases. Referring to FIG. 18B, when an angular velocity about the Y axis is applied, detecting vibration is generated in the two outer arms, which vibrate in parallel with the Z axis so that one of the two outer arms moves forward and simultaneously the other moves backward. Similarly, the two inner arms 12 vibrate in parallel with the Z axis so that one of the two inner arms moves forward and simultaneously the other moves backward. The detecting vibration is sensed via detecting electrodes (not shown), so that the angular velocity about the Y axis can be detected.

Figure 19:
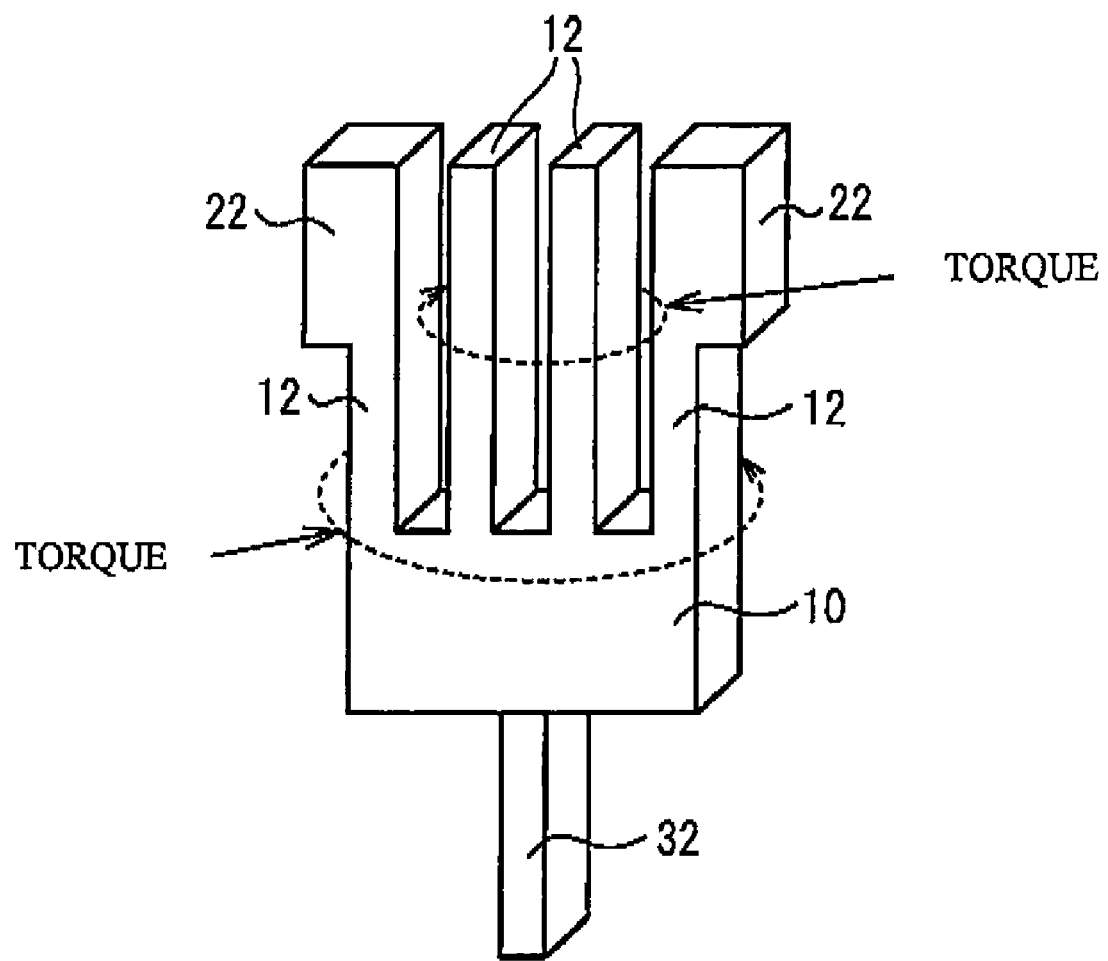
FIG. 19 shows effect of driving vibrations by four arms.

According to the fourth embodiment, the four arms 12 are driven to vibrate so that the two outer arms 12 and the two inner arms 12 are counter-balanced with each other in opposite phases. Thus, as shown in FIG. 19, torque generated in the two outer arms 12 and torque generated in the two inner arms 12 act in opposite directions, so that these torques can be canceled. It is thus possible to more effectively restrain twist displacement of the base 10 and that of a support member 32, which is connected to the base 10 and is used to support the tuning-fork vibrator. Further, it is possible to obtain a wider supportable region on the base 10 to which the support member 32 can be attached since twist displacement of the base 10 is well restrained.

Figures 20A, 20B:
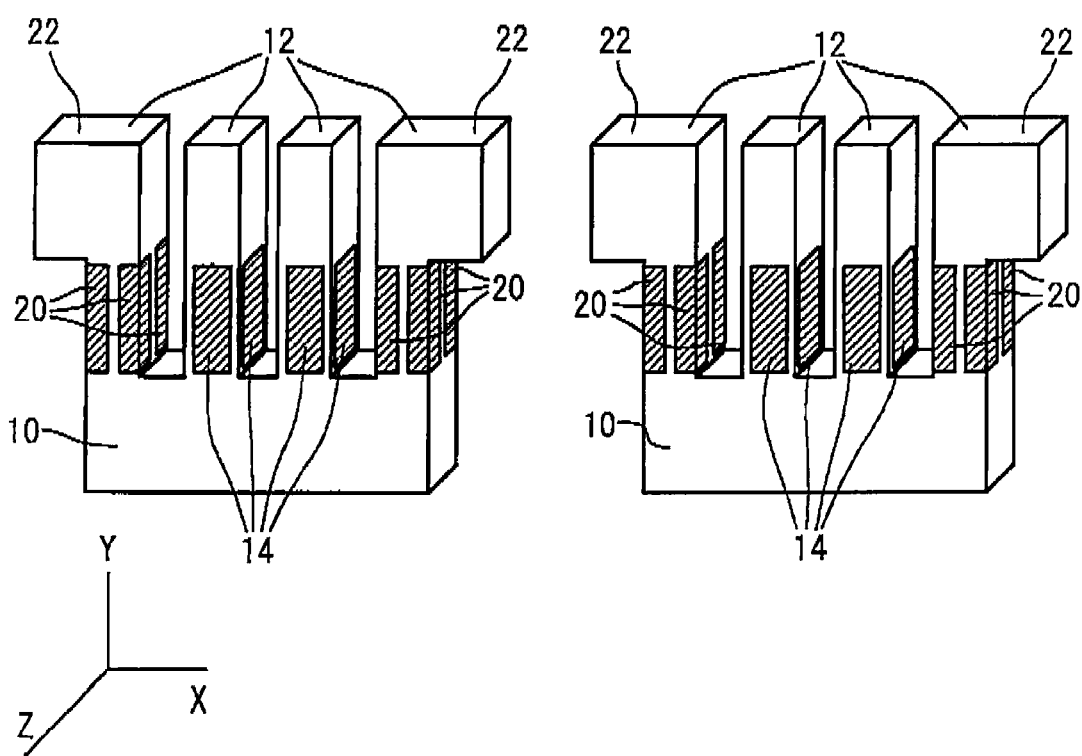
FIGS. 20A and 20B are perspective views of a front and a back surface of the tuning-fork vibrator of the angular velocity sensor when another electrode arrangement is employed.

According to the fourth embodiment, as in the case of the second embodiment, the driving electrodes 20 are provided so as to extend from the front and back surfaces of the arms 12 driven to vibrate to the side surfaces that face each other. It is thus possible to increase the densities of the electric fields between the driving electrodes 20 generated in the arms 12 and to improve the drive efficiency. According to the fourth embodiment, the four arms 12 are involved in driving vibration. Thus, it is possible to arrange the driving electrodes 20 so as to extend from the front and back surfaces of the two outer arms 12 to the side surfaces that face each other and the other side surfaces opposite to the above side surfaces and to arrange the driving electrode 20 on the front, back and side surfaces of the two arms 12. It is thus possible to further enhance the densities of the electric fields in the arms 12 between the driving electrodes 20 and to further improve the driving efficiency. In FIG. 20, only the driving electrodes 20 and the detecting electrodes 14 provided on the arms 12 are illustrated for the sake of simplicity.

The above-mentioned structure of the fourth embodiment employs the driving electrodes 20 provided on the two outer arms 12. Similar effects can be obtained in another arrangement in which the driving electrodes 20 are provided on the two inner arms 12.

Fifth Embodiment

A fifth embodiment has an exemplary structure directed to sensing angular velocity about the Z axis of the tuning-fork vibrator of the angular velocity of the fourth embodiment, that is, the thickness direction of the arms 12. FIG. 21A shows driving vibration, and FIG. 21B shows detecting vibration when an angular velocity about the Z axis is applied. The driving vibration shown in FIG. 21A is the sane as that of the fourth embodiment, and a description thereof will be omitted here. Referring to FIG. 21B, when an angular velocity about the Z axis is applied, the two outer arms 12 vibrate in parallel with the X axis in the same direction. Similarly, the two inner arms 12 vibrate in parallel with the X axis in the same direction. The detecting vibration of the two outer arms 12 and that of the two inner arms 12 are 180 degrees out of phase. Detecting electrodes (not shown) sense the detecting vibrations so that the angular velocity about the X axis can be detected.

The above-mentioned first through fifth embodiments have the tuning-fork vibrators having two or four arms. However, the present invention is not limited to the above but may employ a tuning-fork vibrator having another number of arms.

The present invention is not limited to the specifically disclosed embodiments, but other embodiments and variations may be made without departing from the scope of the present invention.

The present application is based on Japanese Patent Application No. 2007-043363 filed Feb. 23, 2007, the entire disclosure of which is hereby incorporated by reference.

What is claimed is:

1. A method for fabricating an angular velocity sensor having a tuning-fork vibrator that has a base and arms extending from the base comprising:

cutting a substrate made of one of $LiNbO_3$ and $LiTaO_3$ into a piece;

forming grooves extending from external side surfaces of opposite sides of the piece to inside of the piece alternately, the grooves having a length equal to or greater than half of a distance connecting the external side surfaces of the opposite sides and forming a side surface of a part that forms the base and a part that forms the arms except for an end part of the arms, and dividing the piece into parts by dividing grooves that are formed in the piece located between an end of the grooves extending from either one of the external side surfaces of the opposite sides and an external side surface located in front of the end of the grooves, the dividing grooves being narrower than the grooves.

2. The method as claimed in claim 1, wherein forming grooves forms the grooves that extend from the external side surfaces of the opposite sides of the piece in turn at predetermined constant intervals.

3. The method as claimed in claim 1, wherein forming grooves forms the grooves so that one of the grooves extending from one of the external side surfaces of the opposite sides is located in the center of two adjacent ones of the grooves extending from the other one of the external side surfaces of the opposite sides.

4. The method as claimed in claim 1, wherein dividing the piece divides the piece into parts in the center of the grooves.

5. The method as claimed in claim 1, wherein forming grooves forms the grooves by employing a dicing or laser process and dividing the piece divides the piece into parts by employing a dicing or laser process.

* * * * *